United States Patent
Peart et al.

[11] 3,806,150
[45] Apr. 23, 1974

[54] VEHICLE SPRING DAMPER

[75] Inventors: Joseph R. Peart, Dearborn; Bernell F. Walz, Allen Park, both of Mich.

[73] Assignee: Ford Motor Company, Dearborn, Mich.

[22] Filed: June 28, 1972

[21] Appl. No.: 266,888

[52] U.S. Cl............................ 280/124 R, 267/61 S
[51] Int. Cl.............................................. B60g 17/06
[58] Field of Search..... 280/124 R; 267/20 R, 61 R, 267/61 S, 103, 104, 62, 60, 59, 28, 33, 34

[56] References Cited
UNITED STATES PATENTS

| | | | |
|---|---|---|---|
| 3,128,087 | 4/1964 | Hughes | 267/61 S |
| 2,711,315 | 6/1955 | Mosebach | 280/124 R |
| 2,673,084 | 3/1954 | Blythe | 267/60 |
| 3,674,250 | 7/1972 | Joseph | 267/61 S |
| 1,679,698 | 8/1928 | Weydert | 267/33 |

*Primary Examiner*—Philip Goodman
*Assistant Examiner*—John A. Carroll
*Attorney, Agent, or Firm*—Keith L. Zerschling; Clifford L. Sadler

[57] ABSTRACT

A vehicle suspension system having in its preferred embodiment an unique coil spring system interposed between sprung and unsprung vehicle components. A plurality of annular elastomeric dampers are loosely positioned on the coil spring for the purpose of attenuating objectionable spring vibration.

6 Claims, 5 Drawing Figures

PATENTED APR 23 1974 3,806,150

3,806,150

VEHICLE SPRING DAMPER

BACKGROUND OF THE INVENTION

The present invention relates generally to motor vehicle suspension systems, and more particularly to suspension systems having coil springs. A coil spring, as used in a vehicle suspension, when vibrated at one end at certain frequencies will exhibit high vibration transmission to the other end. This undesirable characteristic is caused by the presence of standing waves or spring surge in the coils.

BRIEF SUMMARY OF THE INVENTION

In the preferred embodiment of the invention, the coil spring of a vehicle suspension system has a plurality of elastomeric annular members loosely fitted over the spring wire. The plurality of elastomeric members are positioned around the spring for a suitable distance such as one coil. Clamping means such as a pair of plastic C-shaped members engage the spring and prevent the displacement of the elastomeric members along the spring.

The elastomeric members attenuate the vibration by a combination of friction and mass interference caused by relative motion between the sleeves or annular members and the spring wire when the spring is vibrating.

DESCRIPTION OF THE DRAWING

The many objects and advantages of a vehicle suspension constructed in accordance with this invention will become apparent upon examination of the attached drawings and the following description. In the drawings.

DETAILED DESCRIPTION OF THE PREFERRED EMBODIMENT

Figure 1:
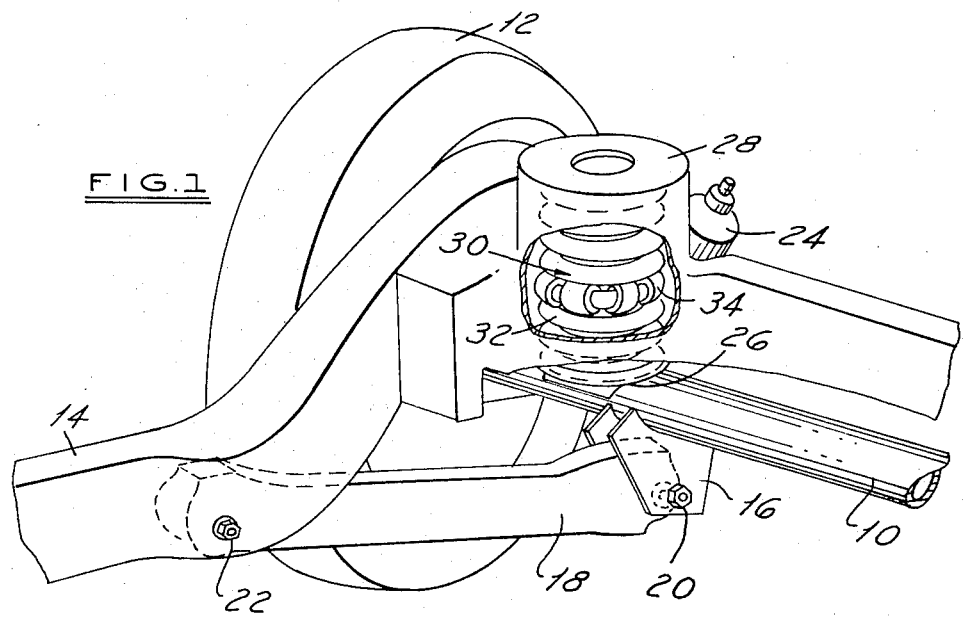
FIG. 1 is a perspective of a vehicle suspension having a suspension spring system constructed in accordance with this invention.
Figure 2:
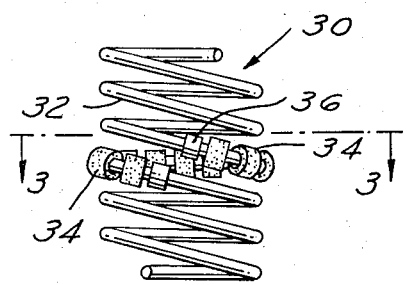
FIG. 2 is a side elevational view of the coil spring and damping means of FIG. 1.
Figure 3:
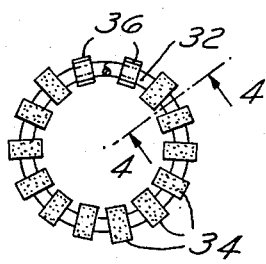
FIG. 3 is a sectional view of the coil spring and damping means taken along section lines 3—3 of FIG. 2.

Referring now to the drawings wherein the presently preferred embodiment of this invention is disclosed, FIG. 1 shows a vehicle suspension system having a damped coil spring. An axle housing 10 rotatably supports an axle shaft (not shown) which drives a road wheel 12. The sprung vehicle components, including a frame assembly 14, are supported on the axle housing 10 and wheel 12 by a suspension system.

The suspension system includes a depending bracket 16 that is welded to the outer end of the axle housing 10. A suspension arm 18 is pivotally connected at its rearward end to the bracket 16 by a rubber bushing and a pivot bolt 20. A pivot bolt 22 and a rubber bushing pivotally connects the forward end of the arm 18 to the frame assembly 14. A direct acting hydraulic shock absorber 24 is interposed between a bracket secured to the axle housing 10 and a sprung component of the vehicle chassis.

A lower spring seat 26 is welded to the upper surface of the axle housing 10. An upper spring seat 28 is formed in the frame assembly 14. A coil spring system 30 is interposed between the lower spring seat 26 and the upper spring seat 28.

FIGS. 2 to 5 disclose the construction of the spring assembly 30 in greater detail. The spring assembly 30 includes a coil spring 32 which comprises a wire that is wound in helical form. The upper and lower end loops or coils of the coil spring 32 may be of reduced diameter to permit attachment to the spring seats 26 and 28.

Figure 4:
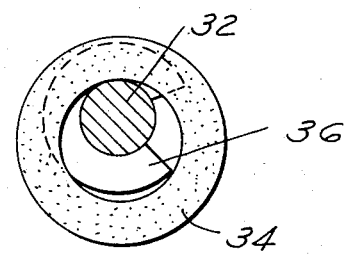
FIG. 4 is a sectional view taken along section line 4—4 of FIG. 3.
Figure 5:
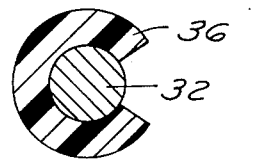
FIG. 5 is a sectional view of the coil spring and the damping means retainer.

A plurality of elastomeric annular damping members 34 are loosely positioned about one 360° coil of the spring 32. The damping members 34 are situated generally midway between the ends of the spring 32. As seen in FIG. 4, the damping members 34 are of annular configuration and have an interior opening that is substantially bigger than the outside diameter of the wire which forms the coil spring 32. Short sections of rubber hose may be used to form the annular dampers 34.

Situated at each end of the series of dampers 34 is a C-shaped retainer 36. The retainer 36 may be formed of hard plastic and has an interior opening that is normally slightly less in size than the outside diameter of the spring wire 32. With this construction, the retainer 36 may be snapped onto the coil spring 32 and, thus, held in position by its own resiliency.

OPERATION

When a vehicle with a suspension of FIG. 1 is driven over an irregular road, vibrations will be induced in the low end of the coil spring 32. Normally, these vibrations may be transmitted through the spring 32 to the vehicle frame 14 where they will cause objectionable disturbances in the passenger compartment of the vehicle. In accordance with this invention, the plurality of dampers 34 are effective to attenuate the vibrations in the spring 32 and prevent the vibrations from being transmitted to the frame 14.

The spring system achieves damping by a combination of friction and mass interference caused by relative motion between the damping members and the spring wire when the wire is vibrating. Advantages possessed by this invention include its simplicity of construction and its effective operation. It markedly reduces vibration transmissability while it does not interfere with the normal operation of the suspension. It does not introduce static friction or greatly alter the inside or outside diameter of the spring.

The foregoing description presents the presently preferred embodiment of the invention. Modifications and alterations may occur to those skilled in the art which will come within the scope and spirit of the following claims.

We claim:

1. A vehicle suspension spring system having a spring constructed to be interposed between sprung and unsprung vehicle suspension components,
    said spring comprising a helically shaped wire,
    a plurality of annular non-metallic dampers,
    said dampers being positioned on said wire in side-by-side relationship,
    said annular dampers each being radially displaceable relative to said wire without deformation of said damper, said damper being constructed to attenuate spring vibration.

2. A vehicle suspension spring system according to claim 1 and including:
retaining means connected to said wire and constructed to limit circumferential displacement of said dampers.

3. A vehicle suspension spring system according to claim 1 and including:
said plurality of dampers covering approximately one coil of said spring.

4. A vehicle suspension system having a vehicle frame,
a wheel support member and a coil spring operatively interposed between said vehicle frame and said wheel support member,
a plurality of non-metallic annular damping members positioned on said coil spring,
said damping members being constructed to attenuate vibration of springs,
each of said damping members covering a minor portion of said spring,
said damping members each being normally displaceable relative to said coil spring without deformation of said member,
stop means connected to said spring and constructed to limit displacement of said members.

5. A vehicle suspension spring system having a spring constructed to be interposed between sprung and unsprung vehicle suspension components,
said spring comprising a helically shaped wire,
a plurality of annular non-metallic dampers,
said dampers being positioned on said wire in side-by-side relationship,
said damper being constructed to attenuate spring vibration,
each of said annular dampers having an interior bore substantially larger in diameter than the outside diameter of said wire.

6. A vehicle suspension spring system having a spring constructed to be interposed between sprung and unsprung vehicle suspension components,
said spring comprising a helically shaped wire,
a plurality of annular non-metallic dampers,
said dampers being positioned on said wire in side-by-side relationship,
said damper being constructed to attenuate spring vibration,
retaining means connected to said wire and constructed to limit displacement of said dampers,
said dampers covering approximately one coil of said spring,
each of said annular dampers having an interior bore substantially larger in diameter than the outside diameter of said wire,
each of said damping members covering a minor portion of said spring.

* * * * *